United States Patent
Benthien

(10) Patent No.: US 12,187,455 B2
(45) Date of Patent: Jan. 7, 2025

(54) METHOD FOR INSTALLING A FASTENING STRUCTURE FOR AT LEAST ONE COMPONENT ON AN ATTACHMENT STRUCTURE OF A VEHICLE INTERIOR AND JIG FOR POSITIONING A FASTENING STRUCTURE

(71) Applicant: Airbus Operations GmbH, Hamburg (DE)

(72) Inventor: Hermann Benthien, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 106 days.

(21) Appl. No.: 18/084,077

(22) Filed: Dec. 19, 2022

(65) Prior Publication Data
US 2023/0192319 A1    Jun. 22, 2023

(30) Foreign Application Priority Data
Dec. 21, 2021    (EP) ..................................... 21216564

(51) Int. Cl.
*B64F 5/10* (2017.01)
*B64D 11/00* (2006.01)

(52) U.S. Cl.
CPC .............. *B64F 5/10* (2017.01); *B64D 11/003* (2013.01)

(58) Field of Classification Search
CPC .................................. B64D 11/003; B64F 5/10
See application file for complete search history.

(56) References Cited

U.S. PATENT DOCUMENTS

| 6,883,753 | B1 | 4/2005 | Scown | |
|---|---|---|---|---|
| 2002/0159046 | A1* | 10/2002 | Binnard | G03F 7/70716 355/75 |
| 2016/0347436 | A1* | 12/2016 | Doran | B64D 11/003 |
| 2017/0057611 | A1* | 3/2017 | King | B64F 5/10 |

(Continued)

FOREIGN PATENT DOCUMENTS

| DE | 102019114519 A1 | 12/2020 |
|---|---|---|
| EP | 3135585 A1 | 3/2017 |
| EP | 3266706 A1 | 1/2018 |

OTHER PUBLICATIONS

European Search Report dated May 23, 2022; priority document.

*Primary Examiner* — Tye William Abell
*Assistant Examiner* — Justin Michael Heston
(74) *Attorney, Agent, or Firm* — Greer, Burns & Crain, Ltd.

(57) ABSTRACT

A method for installing a component fastening structure on an attachment structure where the fastening structure includes a unit including an elongate body, a first strut detachably coupled between the elongate body and a first fastening for fastening the unit to the attachment structure, a second strut detachably coupled at an inclined angle between the elongate body and the first fastening. The first and/or second strut are variably positionable relative to the elongate body and are lockable in an end position. A jig including a support structure is detachably coupled to the fastening structure elongate body, and a height adjustment device on which the support structure is mounted, is adjusted to arrange the first elongate body at a pre-determined height. The jig is moved relative to the attachment structure to engage the first fastening with an attachment structure first fixture and fastening the first fastening to the first fixture.

14 Claims, 7 Drawing Sheets

(56) References Cited

U.S. PATENT DOCUMENTS

| | | |
|---|---|---|
| 2018/0009530 A1 | 1/2018 | Benthien |
| 2020/0108904 A1* | 4/2020 | Cysewski ................ E04B 1/30 |
| 2020/0324918 A1 | 10/2020 | Hegenbart et al. |
| 2021/0031922 A1* | 2/2021 | Cassou ................ B64D 11/003 |
| 2021/0300560 A1 | 9/2021 | Benthien et al. |

* cited by examiner

METHOD FOR INSTALLING A FASTENING STRUCTURE FOR AT LEAST ONE COMPONENT ON AN ATTACHMENT STRUCTURE OF A VEHICLE INTERIOR AND JIG FOR POSITIONING A FASTENING STRUCTURE

CROSS-REFERENCES TO RELATED APPLICATIONS

This application claims the benefit of the European patent application No. 21216564.1 filed on Dec. 21, 2021, the entire disclosures of which are incorporated herein by way of reference.

FIELD OF THE INVENTION

The invention relates to a method for installing a fastening structure for at least one component on an attachment structure of an interior of a vehicle and a jig for positioning a fastening structure.

BACKGROUND OF THE INVENTION

The interior of a vehicle, such as a motor vehicle or an aircraft, is typically fitted out with components, such as panels, luggage bins, storage bins, service units, seats, etc., which are fastened to the interior of vehicle. A fastening structure may be used for fastening the component to an attachment structure of the interior of the vehicle. The attachment structure may be a frame or a flange, for example. US 2021/0300560 A1 discloses fastening apparatus and a fastening arrangement for fastening a cabin interior component to an interior of an aircraft.

The components are typically mounted on and attached to the attachment structure manually. It is desirable that the fastening structure is able to distribute loads uniformly into the attachment structure and the vehicle body. Additionally, it is desirable that the fastening system can be easily connected to the attachment structure to allow the interior component to be reliably fastened to the interior of the vehicle. To improve the visual impression of the components visible to the passengers, an exact positioning of the components is desirable, for example so that the spacing between components is uniform.

SUMMARY OF THE INVENTION

An object is to provide an improved method for fastening an interior component to the interior of a vehicle.

According to the invention, a method for installing a fastening structure for at least one component on an attachment structure of an interior of a vehicle is provided. The method comprises providing a fastening structure comprising at least one unit. At least one unit comprises an elongate body, a first strut detachably coupled between the elongate body and a first fastening for fastening the unit to the attachment structure, and a second strut that is detachably coupled between the elongate body and the first fastening and that extends at an inclined angle to the elongate body. The first strut and/or second strut are variably positionable with respect to the elongate body to provide tolerance compensation and are lockable in an end position. A jig is provided that comprises a support structure that is detachably couplable to the elongate body of the fastening structure, and one or more height adjustment devices on which the support structure is mounted. The height adjustment device(s) are continuously adjustable and lockable in a desired position. The method further comprises adjusting the height adjustment device of the jig such that the first elongate body is arranged at a pre-determined height, moving the jig with respect to the attachment structure such that the first fastening engages with a first fixture of the attachment structure and fastening the first fastening to the first fixture to install the fastening structure on the attachment structure. The variable positioning of the first strut and/or the second strut provides tolerance compensation between the elongate body and the fixture.

The unit provided by the first strut, second strut and elongate body provides a frame on which a component can be mounted. The first strut, second strut and elongate body form a triangle shape that can be adjusted. The unit can be preassembled on the jig, whereby the predetermined height of the elongate body is set by adjusting the height adjustment devices. The fastening is then attached to the fixture determine the position of the fastening of the unit. The variably positionable first and second struts of the fastening structure are used to couple the elongate body to the attachment structure. The first and second strut can be moved and the position of one or both of the first and second struts adjusted to bridge the space between the fixture and the elongate body and to compensate for any variations between the positions of the fixture and the elongate body from the expected position. As a result of this method, the height of the elongate body remains at the predetermined height after removal of the jig since any variations in the distance or orientation between the fixture and the elongate body are compensated by means of the variably positionable first and second struts of the fastening structure. Thus, the position of the elongate body can be set independent of the position of the fixture by the intervening variable positioning function of the fastening structure. The height of the elongate body can also be set irrespective any variations in the distance to the floor or surface on which the jig is arranged. In this regard, the height refers to a vertical position, i.e., a position in the Z direction rather than the spacing above the floor or surface.

In some embodiments, after fastening the first fastening to the first fixture, the position of the first and second strut is locked with respect to the elongate body. This embodiment can be used if the first and/or second strut are positionally adjusted after the first fastening is fastened to the first fixture. After the fastening structure has been installed on the attachment structure of the vehicle, the jig is removed.

In order to allow a fine adjustment of the height, the height adjustment device is adjustable in a continuous, that is, stepless, manner. In an embodiment, the height adjustment device comprises a first part having an inclined inner surface and a second part having an inclined inner surface, the inclined inner surfaces cooperating to form a wedge-shaped gap. A wedge is slidably arranged between the inclined surfaces of the first and second part. Moving the height adjustment devices comprises moving the wedge in a substantially horizontal direction and causing the first and second parts to move apart in a substantially vertical direction, i.e., perpendicular to the movement of the wedge, thus adjusting a height of the support structure such that the first elongate body is arranged at the pre-determined height. The height of this height adjustment device is easy to adjust compared to the use of separate shims of predetermined thickness, for example, and also allows a fine and accurate setting of the vertical position of the elongate body.

In some embodiments, the method further comprises moving the jig with respect to the attachment structure in a longitudinal direction of the vehicle such that the first fastening engages with the fixture. The height of the elongate body can be set by appropriate adjustment of the height adjustment device or devices and then the jig being moved in the longitudinal direction of the vehicle.

In some embodiments, the method further comprises installing at least one further unit on the attachment structure, for example adjacent to the unit in the longitudinal direction of the vehicle. The elongate body of the further unit is positioned at the pre-determined height by means of the height adjustment device. This enables a plurality of elongate bodies to be positioned at the same height, since the fastening structure provides any necessary spatial compensation between the elongate body and the attachment structure. This may be useful for a vehicle having a long length, for example a fuselage of an aircraft or a train, in which the components should be arranged in a row and have the same height.

In some embodiments, the elongate body may be used to determine the position of the base of the component. This may be useful for components mounted towards the upper part of the interior of the vehicle, for example overhead luggage bins in the passenger compartment. In other embodiments, the elongate body can be used to determine the position of the top of the component. This may be useful for components mounted towards the lower part of the vehicle interior.

The internal structure of the unit may vary in order to provide variable positioning of the first and/or second strut with respect to the elongate body. In some embodiments, the elongate body and one or both of the first and second struts are formed by tubes. In some embodiments, the elongate body is detachably coupled to the first strut by a connector and one height adjustment device is arranged underneath the connector. The connector may be lockable to the elongate body and to the first strut so as to fix the relative position between the elongate body and the first strut.

In some embodiments, the first strut and/or second strut are variably positionable with respect to the elongate body to provide tolerance compensation in a longitudinal and in a vertical direction. For example, the first strut and/or the second strut may have an adjustable length and/or an adjustable angular orientation with respect to the elongate body. The length and angular orientation of the first and second strut is lockable in order to provide the unit with a mechanically stable frame structure.

In some embodiments, the first fastening comprises a spring to provide tolerance compensation and provide improved load distribution between the fastening structure and the attachment structure of the vehicle interior.

In some embodiments, the second strut is slidably coupled to the elongate body at one end to provide tolerance compensation. The position of the opposing end of the second strut can be fixed at the fastening. The position of the second strut on the elongate body is lockable so that the inclined angle between the second strut and the elongate body can be fixed in order to provide the unit with a mechanically stable frame structure.

In some embodiments, the first strut and/or second strut comprises an inner member slidably engaged with an outer member to provide an adjustable length. The inner and outer members may be tubular, for example, with the inner member having an outer diameter which is less than the inner diameter of the outer member so that a slidable connection is provided which allows the overall length of the strut to be increased or decreased as desired. The inner and outer members are lockable to one another, for example by using a bolt, to fix the length of the strut.

In some embodiments, the first strut is coupled to the first elongate body by an articulated or universal joint to provide tolerance compensation. For example, the first strut may be rotatable in a longitudinal direction and around the longitudinal axis of the elongate body and movable in a transverse direction. Again, the position of the first strut is lockable with respect to the elongate body and fastening in order to provide the unit with a mechanically stable frame structure.

In some embodiments, the elongate body comprises at least one component fixture for fastening the component to the elongate body.

The fastening structure may have a modular structure and have multiple modules that are successively connected and installed on the attachment structure. In some embodiments, each module comprises the unit according to one of the embodiments described above and a further unit which has a structure according to one of the embodiments described above. The two units may be arranged vertically and connected to one another by a connection unit. In some embodiments, the further unit provides the upper unit of the module.

In some embodiments, the further unit comprises an elongate body, a first strut detachably coupled between the elongate body and a second fastening for fastening the upper unit to the attachment structure, a second strut detachably coupled between the elongate body and the second fastening and extending at an inclined angle to the elongate body, wherein the first strut and/or second strut are variably positionable with respect to the elongate body to provide tolerance compensation and are lockable in an end position. In some embodiments, the connection unit of the module comprises a third strut and a fourth strut movably coupled with a third fastening, wherein the third strut is coupled to the elongate body of the first unit and the fourth strut is coupled to the elongate body of the second unit.

The method further comprises fastening the second fastening to a second fixture of the attachment structure and fastening the third fastening to a third fixture of the attachment structure to install the module on the attachment structure. In some embodiments, the first lowermost fastening may be fastened to the first fixture followed by fastening the uppermost fastening to the second fixture followed by the fastening the intermediate third fastening to the third fixture. This enables the position of the two elongate bodies to be set at the predetermined heights independent of the attachment structure and the positionally variable first and second struts of the units and positionally variable third and fourth struts of the connection unit to be adjusted to install the fastening structure on the attachment structure and to compensate for variations in dimensions of the attachment structure.

In some embodiments, the elongate body of the further unit is detachably coupled to the first strut of the upper unit by a connector and one height adjustment device is arranged underneath the connector and adjusted such that the elongate body of the upper unit is positioned at a predetermined height. In this embodiment, the two elongate bodies are arranged at different predetermined heights and tolerance compensation between them is provided by the connection unit. Tolerance compensation between the elongate bodies and the attachment structure of the vehicle interior is provided by the first and second struts as well as the third and fourth struts of the connection unit.

In some embodiments, the vehicle is an aircraft and the attachment structure is provided by a fuselage structure comprising a plurality of fuselage frames spaced apart in a longitudinal direction of the fuselage. The fastening structure is fastened to one of the fuselage frames and the elongate body is spaced apart from the fuselage structure. Each unit may be connected to a fuselage frame. In the case of a module, the first, second and third fastenings are fastening to a common one of the fuselage frames. That is the first, second and third fixtures are spaced apart on the common fuselage frame.

A jig for installing a fastening structure for at least one cabin interior component on a fuselage structure of an interior of an aircraft fuselage is also provided. The fuselage structure comprises a plurality of fuselage frames spaced apart in a longitudinal direction of the fuselage. The fastening apparatus comprises a unit comprising an elongate body, a first strut detachably coupled between the elongate body and a fastening for fastening the unit to the attachment structure, a second strut detachably coupled between the elongate body and the fastening and extending at an inclined angle to the elongate body, wherein the first strut and/or second strut are variably positionable with respect to the elongate body to provide tolerance compensation and are lockable in an end position. The jig comprises a support structure that is detachably couplable to the elongate body and one or more height adjustment devices on which the support structure is mounted. The height adjustment device (s) are continuously adjustable and lockable in a desired position.

In some embodiments, the height adjustment device comprises a first part having an inclined inner surface and a second part having an inclined inner surface, the inclined inner surfaces cooperating to form a wedge-shaped gap, a wedge that is slidably arranged between the inclined surfaces of the first and second part, wherein moving the height adjustment device comprises moving the wedge in a substantially horizontal direction and causing the first and second parts to move apart in a substantially vertical direction, thus adjusting a height of the support structure such that the elongate body can be arranged at a pre-determined height.

The support structure may comprise a plurality of vertical members, each supporting a connector of the unit or module. The vertical members may be coupled by longitudinal and transverse beams to provide a mechanically stable jig for supporting the fastening structure also in a preassembled form.

BRIEF DESCRIPTION OF THE DRAWINGS

Embodiments will now be described with reference to the schematic drawings.

DETAILED DESCRIPTION OF THE PREFERRED EMBODIMENTS

Figure 1:
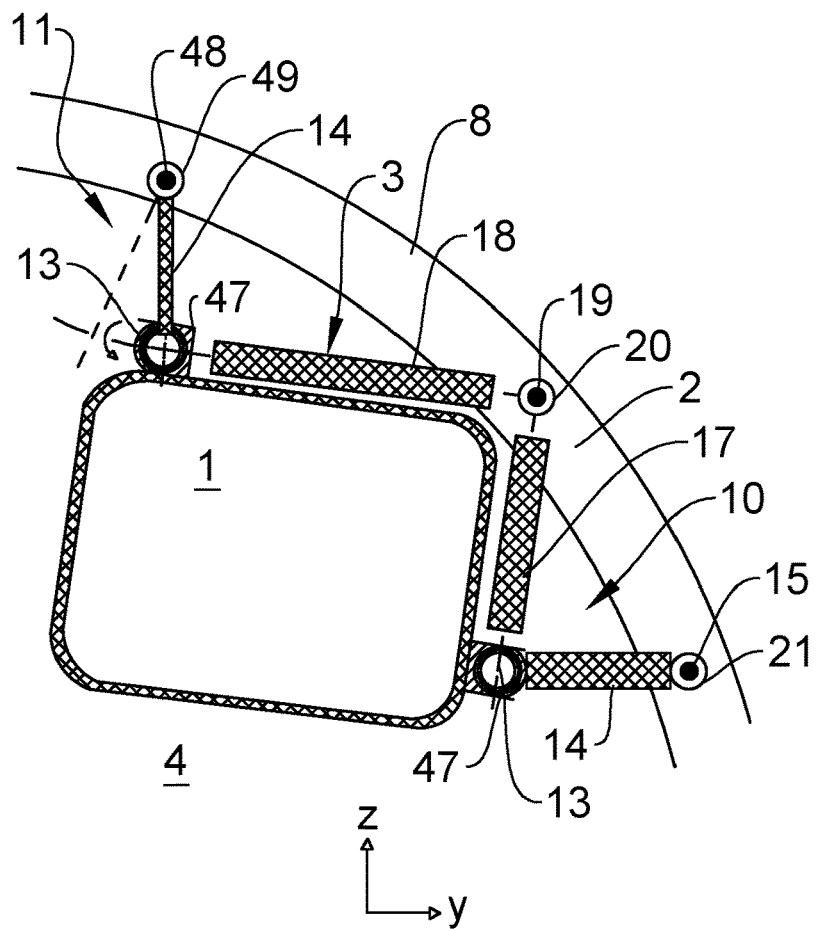
FIG. 1 illustrates a schematic view of an interior component is fastened to an attachment structure of the interior of a vehicle.

FIG. 1 illustrates a schematic view of a component 1 such as an overhead luggage bin which is fastened to an attachment structure 2 positioned at the interior 4 of a vehicle by a fastening structure 3. In the drawings, the fastening structure 3 will be described with reference to an aircraft. However, the fastening structure 3 can also be used to mount other types of components on the interior of other types of vehicles such as motor vehicles, including passenger motor vehicles, trucks and buses or other means of mass transportation such as trains or ships. The fastening means 3 is, however, not restricted to use with overhead luggage bins but may also be used to install other types of interior components at any position above the floor in which adjustment of the height of the component may be desirable.

Figure 2:
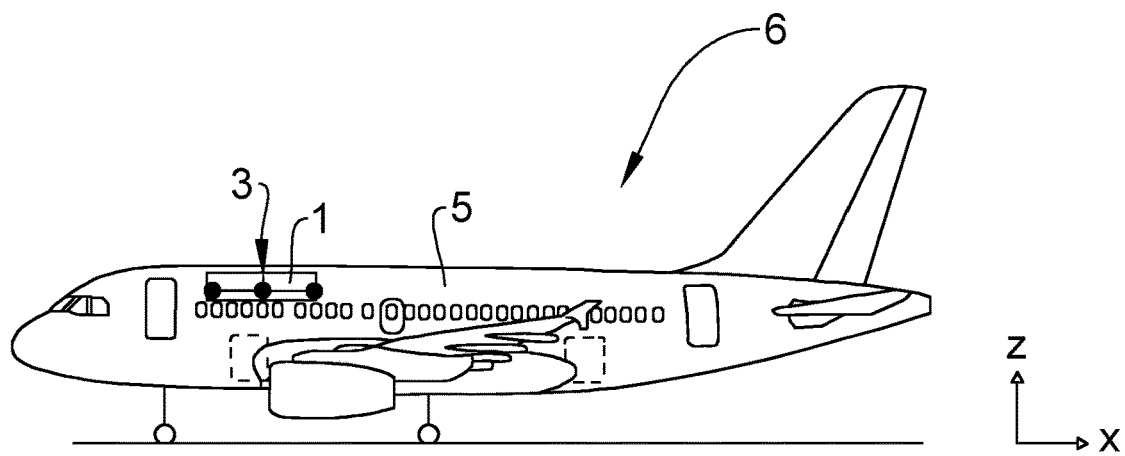
FIG. 2 illustrates an aircraft.

A plurality of luggage bins 1 can be arranged next one another in the vehicle, for example along the longitudinal axis of the vehicle, for example along the length of the fuselage 5 of the aircraft 6, as illustrated in FIG. 2. A passenger aisle typically runs substantially parallel to the longitudinal axis and the row of luggage bins 1. As illustrated with reference to FIG. 2, the longitudinal axis of the aircraft 6 is referred to as the X direction, the transverse axis as the Y direction and the height as the Z direction.

Figure 3A:
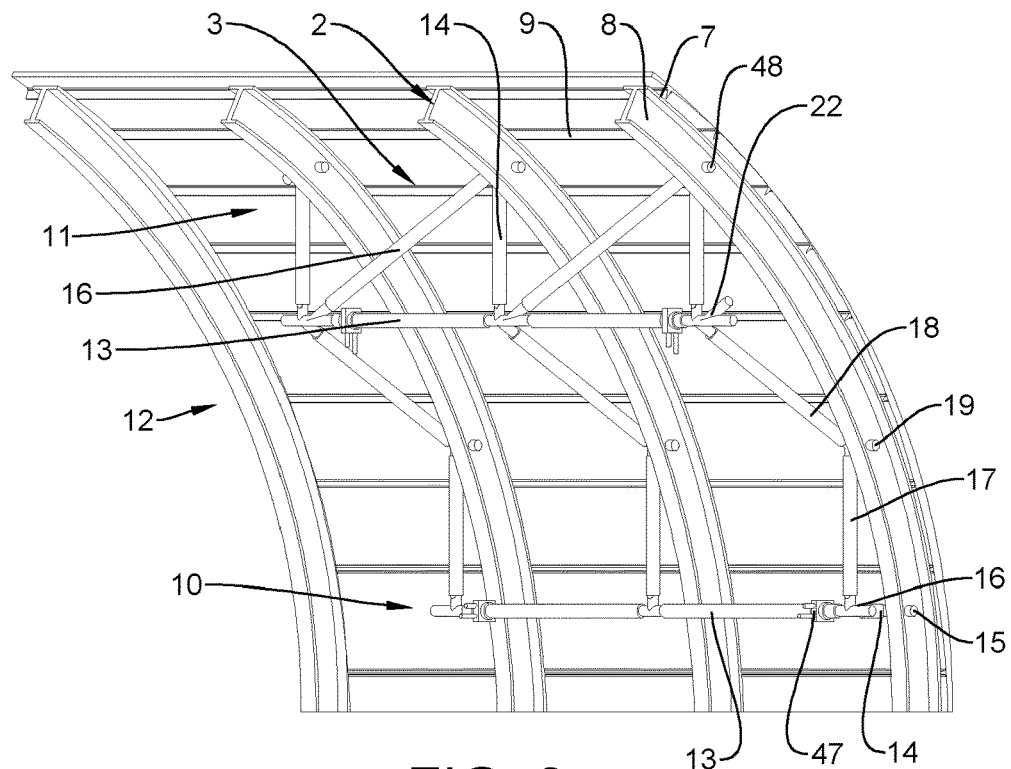
FIG. 3a illustrates a perspective view of a fastening structure for fastening a luggage bin to the fuselage of an aircraft.
Figure 3B:
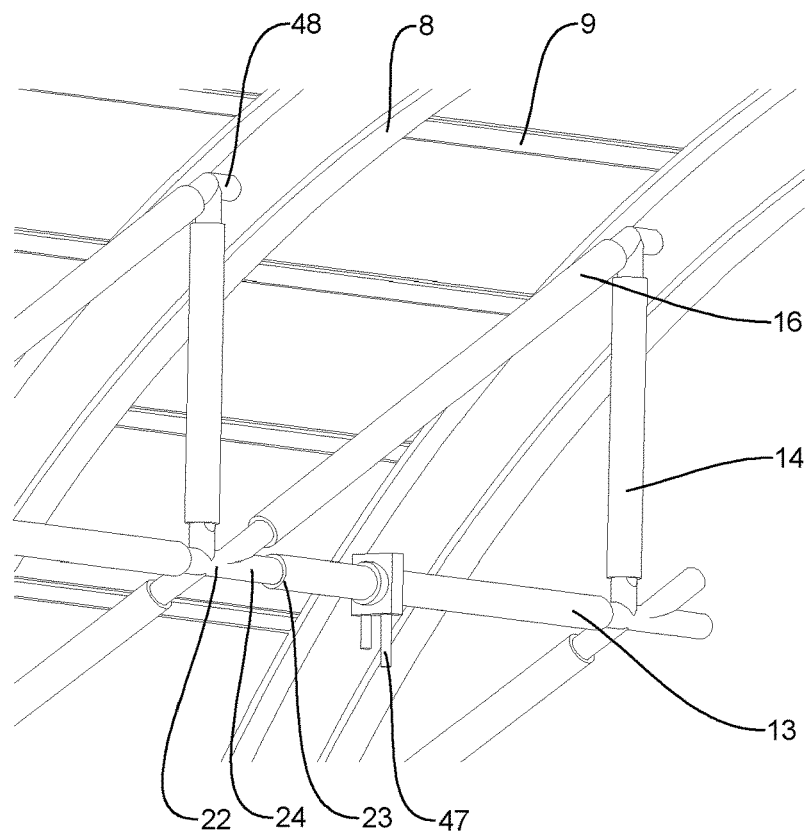
FIG. 3b illustrates an enlarged perspective view of the fastening structure.

FIG. 3a illustrates a perspective view of a fastening structure 3 for fastening a luggage bin to the fuselage 5 of an aircraft 6, and FIG. 3b illustrates an enlarged view of a connection between parts of the fastening structure. The fuselage 5 includes an attachment structure 2 comprising plurality of fuselage frames 8 which encircle the fuselage and a plurality of stringers 9 that are positioned on the outer surface 7 of the fuselage frames 8 and which extend in the longitudinal direction of the fuselage 5 between the fuselage frames 8.

In the illustrated embodiment, the fastening structure 3 has a modular structure with each module comprising a first unit 10, a second unit 11 and a connection unit 12 positioned between the first and second units 10, 11. The second unit 11 being positioned above the first unit 10. The first unit 10 and the second unit 11 each comprise an elongate body 13 on which the component 1 will be fastened. The elongate body 13 may include one or more component fixtures 47 for the component 1. The elongate body 13 and may have a tubular or pipe form. The unit 10 further includes a first strut 14 which is detachably coupled to the elongate body 13 and to a first fastening 15 and a second strut 16 which is detachably coupled to the elongate body 13 and the first fastening 15 and which extends at an inclined angle with respect to the elongate body 13 to the first fastening 15.

The unit 11 also includes a first strut 14 which is detachably coupled to the elongate body 13 and to a second fastening 48 and a second strut 16 which is detachably coupled to the elongate body 13 and the second fastening 48 and which extends at an inclined angle with respect to the elongate body 13 to the first fastening 15. The elongate body 13, first strut 14 and second strut 16 of each unit 10, 11 form a triangular shape which is adjustable. The first second, third and fourth struts 14, 16, 17, 18 may each be provided by a tube. The fastening structure may be orientated with respect to the fuselage 5 such that the elongate body 13 extends in the longitudinal (X) direction of the fuselage 5.

The connection unit 12 includes third and fourth struts 17, 18 and a third fastening 19. The third strut 17 is detachably coupled to the elongate body 13 of the first unit 10 and to the third fastening 19, and the fourth strut 18 is detachably coupled between the elongate body 13 of the second unit 11 and the third fastening 19 to connect the first and second units 10, 11 and form the module. The third fastening 19 is engaged with a third fixture 20 on the fuselage frame 8.

In the mounted position illustrated in FIG. 1, the first fastening 15 of the unit 10 is engaged with a first fixture 21 in the fuselage frame 8, the second fastening 48 of the unit 11 is engaged with a second fixture 49 in the fuselage frame 8 and the third fastening 19 is engaged with the third fixture 20 to fasten the fastening structure 3 to the fuselage frame 8.

The fastenings 15, 19, 48 may comprise an elongate connector such as a bolt or screw and the corresponding fixture 21, 20, 49 may comprise an opening or bore, for example an opening in a clip or flange that is fixedly attached to the fuselage frame 8.

One or both of first and second struts 14, 16 of each of the units 10, 11 provide tolerance compensation. In some embodiments, one or both of the first and second struts 14, 16 are coupled to the elongate body 13, for example by a movable connection 22 whereby the movable connection 22 can be fixed or locked in a desired position after adjustment. The movable connection 22 may be a rotatable joint, rotatable about the longitudinal axis of the elongate body, a slidable joint, slidable along the longitudinal direction of the elongate body 10 or an articulated or universal joint. The connection 22 may be provided by a separate connector structure that couples two elongate bodies 13 to one another in addition to coupling with one of the struts 14, 16 or may be provided by a sleeve that is placed over the elongate body 13 intermediate its length.

In some embodiments, the length of one or both of the first and second struts 14, 16 is adjustable. In these embodiments, one or both of the first and second struts 14, 16 includes an outer member 23 and an inner member 24, which can be seen in the enlarged view of FIG. 3b, which are slidably engaged with one another such that the length of the strut can be varied. The length of the strut may be varied to provide tolerance compensation.

The elongate body 13 may have a length that corresponds to the distance between neighboring fuselage frames 8. The connections 22 between elongate bodies 13 may be positioned such that the first strut 14 of neighboring units is coupled to neighboring fuselage frames 8. The connection 22 between the inclined second strut 16 and the elongate body 13 may be spaced apart in the longitudinal direction from the connection 22 at the opposing end of the elongate body 13.

Figure 6:
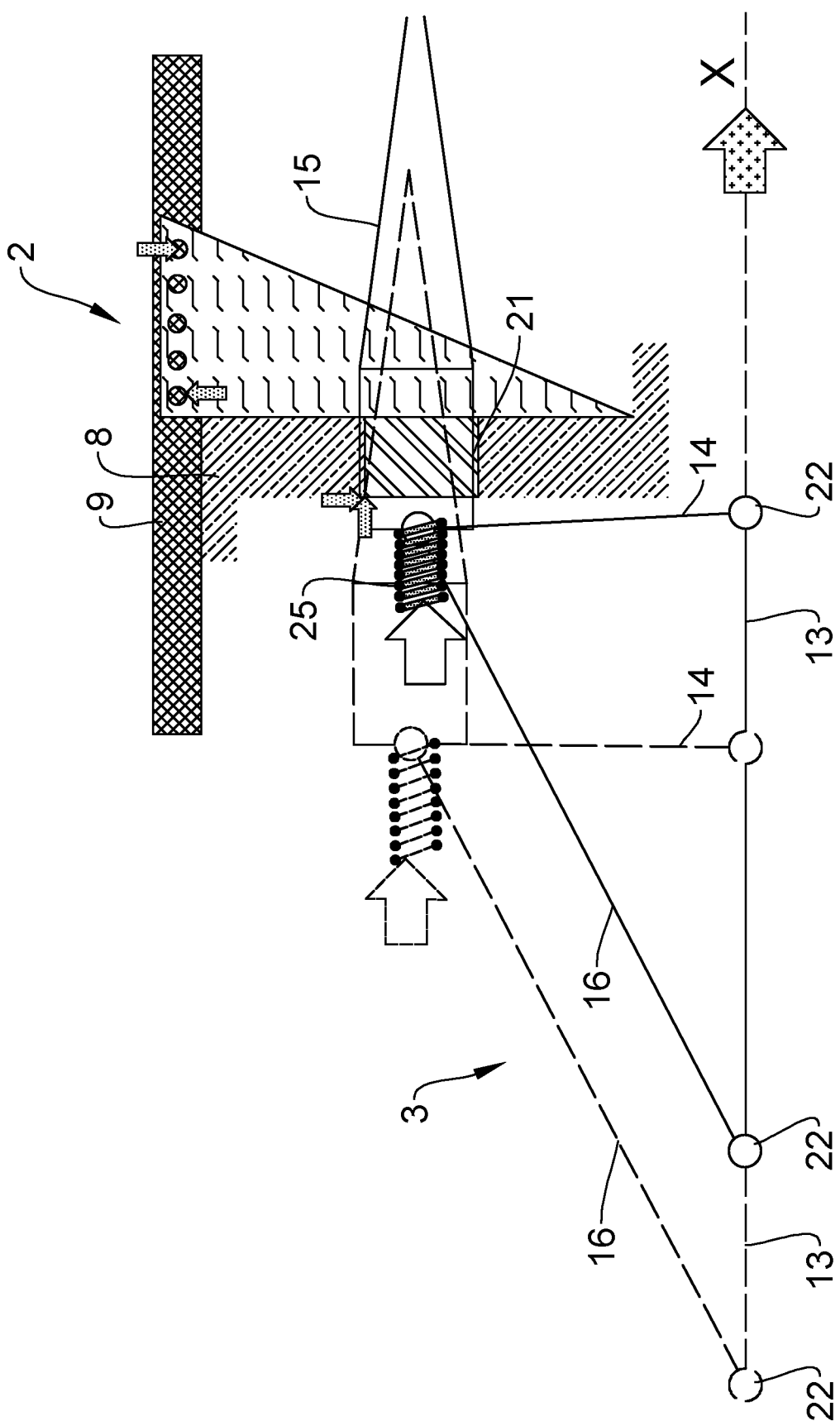
FIG. 6 illustrates a schematic view of the fastening of the fastening structure to the attachment structure of an aircraft.

As is illustrated in FIG. 6, the fastenings 15, 19, 48 may include a spring 25 to provide tolerance and stress compensation between the fastening and the attachment structure and, therefore, between and fastening structure 3 and the attachment structure 2 of the vehicle. The spring 25 may also assist in hindering the transmission of forces and torque to the attachment structure of the vehicle both during installation of the fastening structure and during operation of the vehicle.

A method for installing the fastening structure 3 on the attachment structure 2 of the interior of a vehicle will now be described with reference to FIGS. 4a-4d which illustrates the fastening structure 3 and installing this fastening structure 3 on the interior 4 of a fuselage 5 of an aircraft 6. However, the method can also be used to install the fastening structure on an attachment structure of other types of vehicle such as a train, bus or lorry. The method may also be used for installing fastening structures having designs other than that illustrated in FIG. 2, for example any fastening structure that has at least one part with one or more adjustable lengths or adjustable angular positions.

Figure 4A:
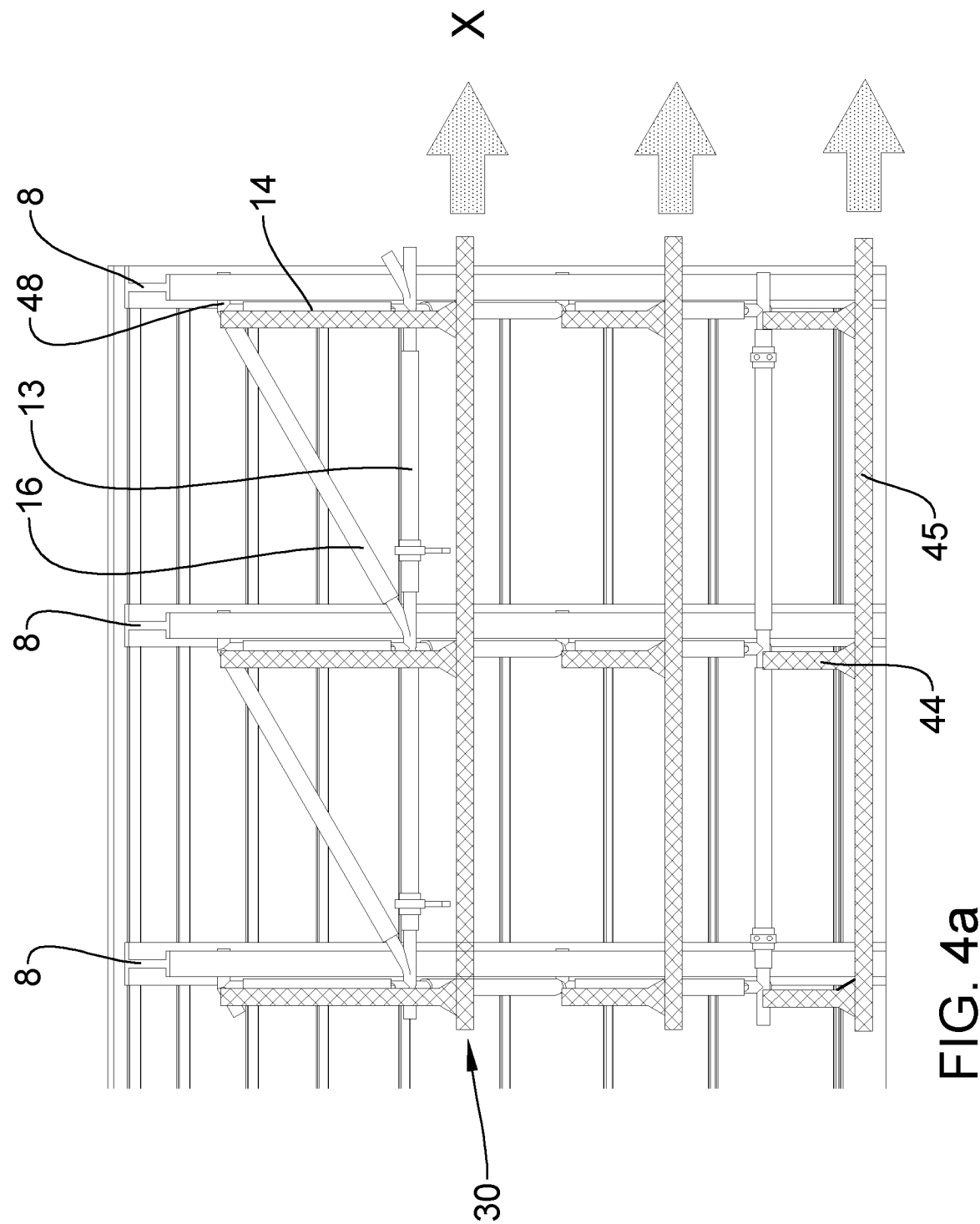
FIG. 4a illustrates a schematic view of a jig and the fastening structure in the X direction.
Figure 4B:
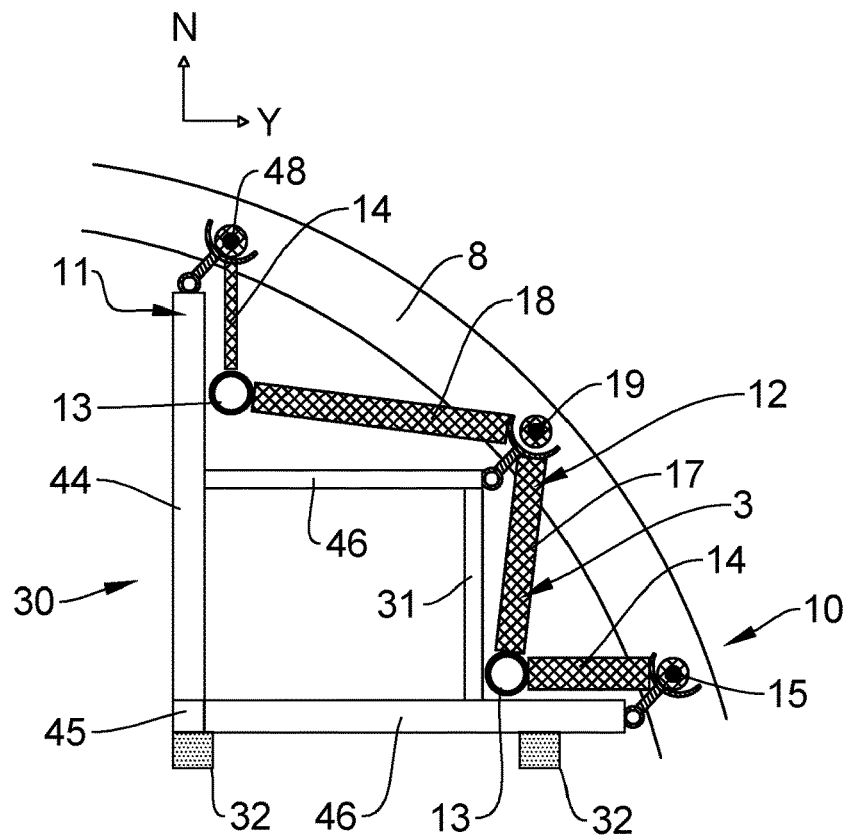
FIG. 4b illustrates a schematic view of the jig with height adjustment devices in the Y direction.
Figure 4C:
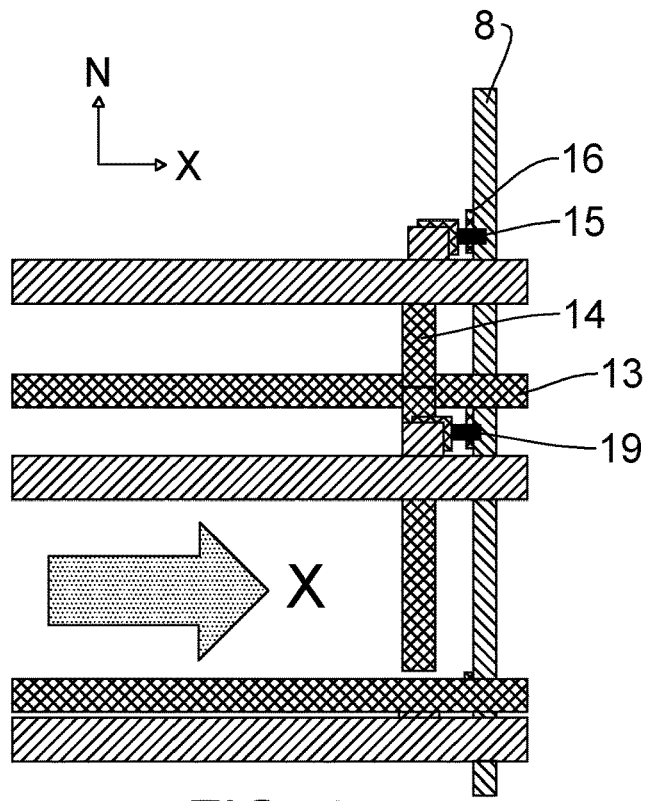
FIG. 4c illustrates a schematic view of the jig with height adjustment devices in the X direction.
Figure 4D:
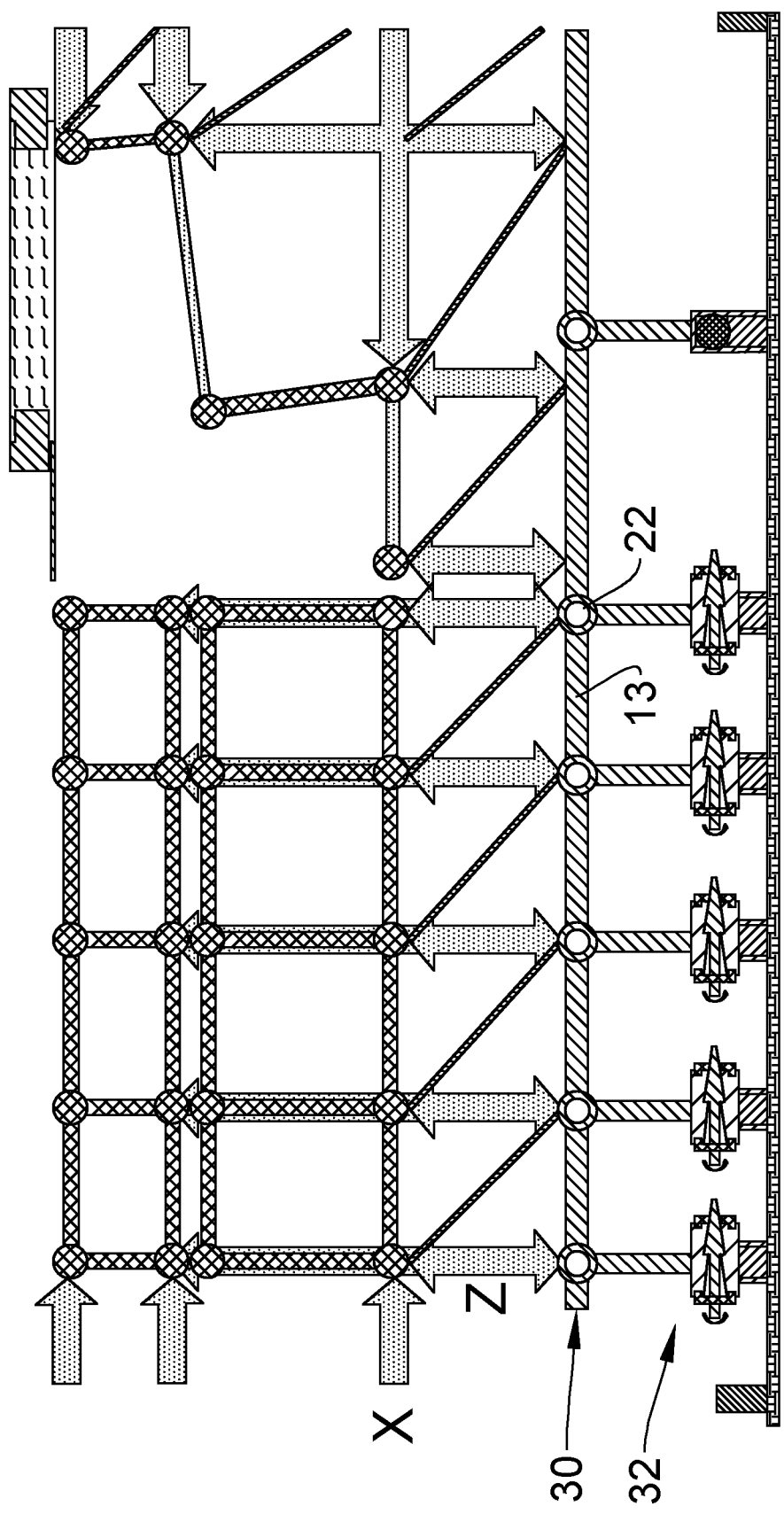
FIG. 4d illustrates a schematic view of the jig and the height adjustment devices.

The fastening structure 3 is positioned with respect to the interior of the fuselage 5 by means of a jig 30 which has height adjustment devices 32. FIG. 4a illustrates a view of the jig 30 in the Y direction. FIG. 4b illustrates a schematic view of the jig 30 in the X direction and indicates the position of height adjustment devices 32 and FIG. 4c illustrates a schematic view of the jig 30 of FIG. 4b in the Y direction. FIG. 4d illustrates a further schematic view of the jig 30 and a plurality of height adjustment devices 32, each positioned under a connection or joint 22 between elongate bodies 13. The jig 30 may be used for installing a fastening structure 3 in the upper half or upper third of the cross-sectional area of the fuselage 5.

The jig 30 comprises a support structure 31 and one or more height adjustment devices 32 on which the support structure 31 is mounted. The height adjustment devices 32 are continuously adjustable and lockable in a desired position. By increasing or decreasing the height of the height adjustment devices 32, the vertical position of the support structure 31 can be adjusted relative to the fuselage frame 8.

The fastening structure 3 is pre-assembled and positioned on the jig 30. The jig 30 is detachably coupled to the elongate body 13 of the lower first unit 10 of the fastening structure 3. The height adjustment devices 32 can be adjusted and locked so that the elongate body 13 of the lower first unit 10 is positioned at a predetermined position in the Z direction, i.e., at a predetermined height. Height adjustment devices 32 may also be arranged under the elongate body 13 of the upper second unit 11, adjusted and locked so that the elongate body 13 of the second unit 11 is positioned at a predetermined position in the Z direction.

As shown by the arrows in FIGS. 4a and 4c, the jig 30 can then be moved in the longitudinal X direction relative to the fuselage frame 8 such that the first fastening 15 is able to engage with the fixture 21 of the fuselage frame 8. The position of the elongate body 13 in the Z direction is determined by the jig 30. The fastening 15 of the first unit 10 is then attached to the fixture 21. The second fastening 48 of the second unit 11 and the third fastening 19 of the connection unit 12 can then be attached to its respective fixture 49, 20 on the fuselage frame 8 and then the first and second struts 14, 16 of the second unit 11 and the third and fourth struts 17, 18 of the connection unit 12 can be adjusted, if necessary, and locked in the desired position relative to the respective elongate bodies 13.

Compensation for variations in the position of the elongate body 13 with respect to the fixture 21 can be compensated by the design of the fastenings 15, 19, 48, for example by a spring 25 as illustrated in FIG. 6 or by adjustment of the length and/or angular orientation of the first and/or second strut 14, 16. The first and second strut 14, 16 may then be locked in position so that fastening structure 3 compensates for any variations in the dimensions of the fuselage frame 8 and any variation in the spacing between the fuselage frame 8 and the predetermined position of the elongate body 13.

This method allows for the elongate body 13 to be positioned at a predetermined vertical position independent of any variations in the form of the fuselage and fuselage frames 8 and variations in height between the surface on which the jig 30 is positioned and the desired position of the elongate body 13 since any variations can be compensated by a subsequent adjustment of the fastening structure 3. The method also allows for the elongate body 13 to have the predetermined position along its length, i.e., to compensate for deviations from the desired plane, e.g., deviations from horizontal.

The jig 30 may also be used for mounting the fastening frame 3 on different attachment structures, since the support frame 31 and the component 1 to be mounted on the fastening structure 3 can be positioned in the desired position by appropriate adjustment and setting, i.e., locking, of the height adjustment devices 32. For example, the jig 30 may be used to install the fastening frame on different classes or designs of aircraft. The component 1, such as a luggage bin, is then attached to the connection unit 12 on the elongate body 13 of one or typically both of the first and second units 10, 11 as illustrated in FIG. 4b.

Typically, a further fastening structure 3 or modules of the fastening structure 3 are then added to the fastening structure in order to support one or more further components. The jig 30 can then be used again for the subsequent modules and the position of the elongate body 13 of those modules is adjusted, if necessary, by adjusting the height adjustment devices 32 of the jig 30 such that the elongate body 13 is at the same predetermined height. This allows for any differences in the shape of the fuselage 5 to be compensated, for example along the over the length of the fuselage 5. This also enables the components 1 to be mounted with a reduced variation in their position with respect to one another since the fastening frame 3 compensates for any variations. This also has the advantage of providing a more uniform visual appearance.

Figure 5A:
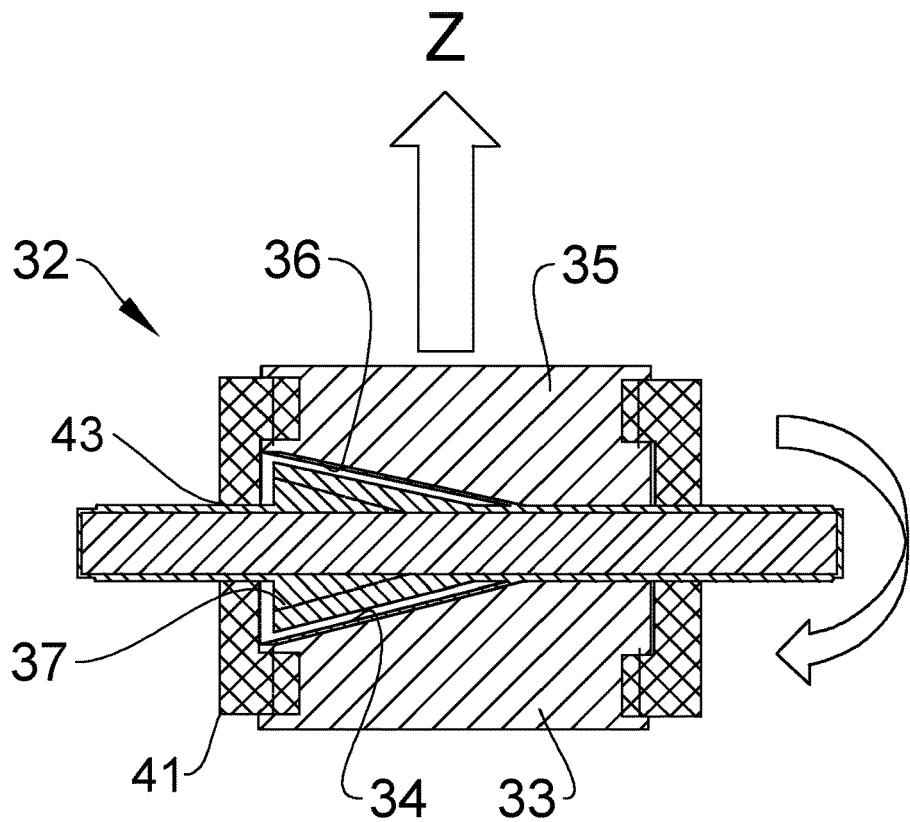
FIG. 5a illustrates a schematic view of the height adjustment device in a lowered position.
Figure 5B:
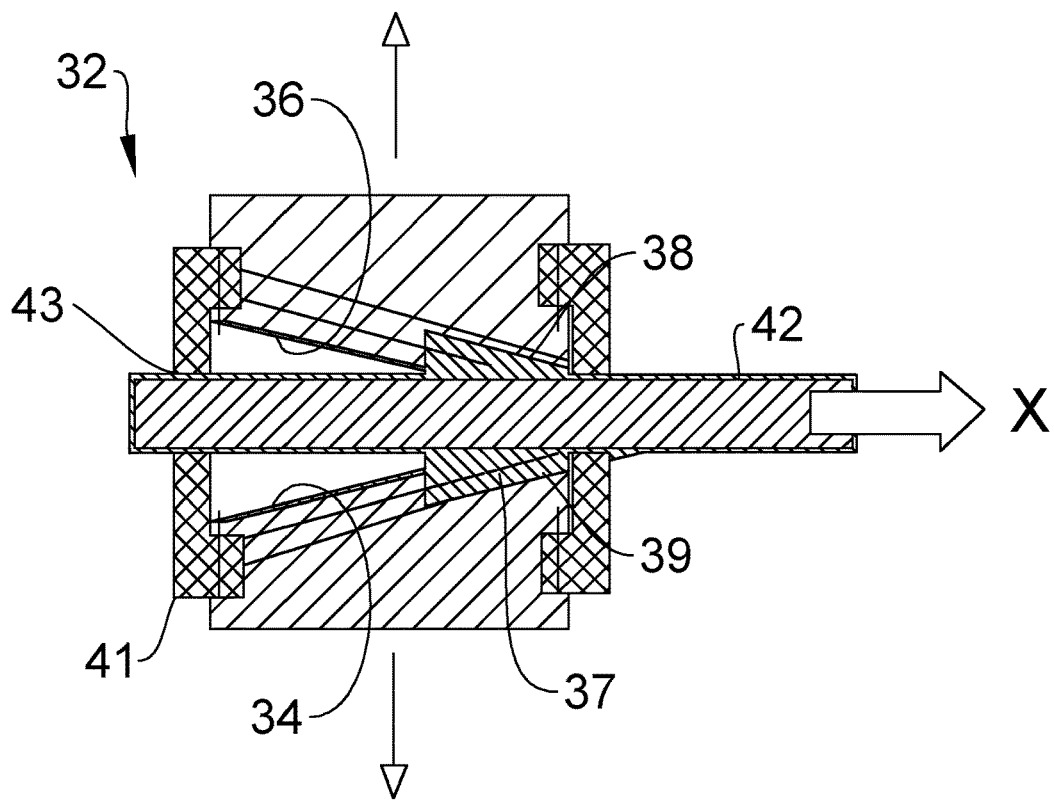
FIG. 5b illustrates a schematic a view of the height adjustment device in a raised position.

The height adjustment device 32 is illustrated in more detail in FIGS. 5a and 5b, whereby FIG. 5a illustrates a view of the height adjustment device 32 in a lowered position and FIG. 5b a view of the height adjustment device 32 in a raised position.

In an embodiment, the height adjustment device 32 comprises a first part 33 having an inclined inner surface 34 and a second part 35 having an inclined inner surface 36, whereby the inclined surfaces 34, 36 are arranged and cooperate to form a tapered or wedge-shaped gap that has a greater height at one end than at the opposing end. The opposing surface of the first part 33 is substantially planar and forms a support surface for the support frame 32. The opposing surface of the second part 35 forms the base. The tapered gap may be substantially triangular in a side view.

The height adjustment device 32 further includes a wedge 37 having two opposing inclined outer surfaces 38, 39 such that the wedge has a greater thickness at one end than at the opposing end and has a substantially triangular shape in a cross-sectional view. The wedge 37 is slidably engaged between the inclined inner surfaces 34, 36 of the first part and second part 33, 35 such that the outer surface 39 of the wedge 37 is slidably arranged on the inclined inner surface 34 of the first part 33 and the outer surface 38 of the wedge 37 is slidably arranged on the inner surface 36 of the second part 35. The wedge 37 may have dimensions which correspond to the gap in the closed position of the height adjustment device 32. The inclined inner surfaces 34, 36 may be formed in a groove formed in the inner surfaces 34, 36 which acts to laterally retain the wedge and avoid sideways movement of the wedge.

In the closed position, the majority of the two opposing inclined surfaces 34, 36 may be in contact with the inclined outer surfaces 38, 39 of the wedge 37. The height of the height adjustment device 32 is increased by moving the wedge 37 in a horizontal direction, for example in the longitudinal (X) direction of the fuselage 5, the inclined surfaces 38, 39 contact the surfaces 34, 36 urging the inner inclined surfaces 34, 36 in opposing vertical directions, thus causing the first and second parts 33, 35 to move apart in a vertical (Z) direction as indicated by the arrows in FIG. 5b and increasing the height of the height adjustment device 32. The position of the wedge 37 can be fixed or locked in order to set the height of the height adjustment device 32.

The height adjustment device also comprises a frame 41 around the first and second parts 33, 35. The frame 41 is slidably engaged with at least two opposing outer sides of the first and second parts 33, 35 that extend substantially perpendicularly to form the planar surfaces. The wedge 37 may be supported on a supporting member 42 of the frame 41, whereby the frame 41 has an opening 43 [need to show in the drawing] through which the wedge 37 and supporting member 42 can be moved.

The use of the wedge 37 and inclined inner surfaces 34, 36 enables the height to be set continuously, that is, stepless, or infinitely adjusted and set, and also allows fine adjustments of the height, Additionally, the height can be quickly and simply adjusted compared to the use of shims of differing pre-determined thickness, for example.

As shown in FIG. 4b, the support frame 31 may include a plurality of vertical members 44 that are positioned on longitudinal beams 45 and which support the elongate bodies 13 of the first and second units 10, 11 and the third struts 17 of the connection unit 12. The vertical members 44 and longitudinal beams 45 may be connected to one another by transverse sections 46 to form a mechanically stable jig 30.

FIG. 6 shows a schematic view of two positions of the fastening structure 3 with respect to the fuselage frame 8 during the alignment and locking of the first fastening 15 to the first fixture 21. As can be seen in FIG. 6, the vertical position of the elongate body 13 remains substantially the same, as the fastening 15 of the fastening structure 3 is introduced into the fixture 21 on the fuselage frame 8 in the X direction and fastened to the fixture 21 in order to lock the fastening structure onto the fuselage frame 8. Any variation in height between the elongate body 13 and the fixture 21 is compensated by adjustment, i.e., movement of the parts of the fastening structure 3, in particular the positionably variable first and second struts 14, 16. The fastening 15 includes a spring 25 for tolerance compensation. After the fastening structure 3 has been installed on the fuselage, one or more components 1 can be mounted on the fastening structure 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 component
2 attachment structure
3 fastening structure
4 interior of the vehicle
5 fuselage
6 aircraft
7 outer surface of fuselage frame
8 fuselage frame
9 stringer
10 first unit
11 second unit
12 connection unit
13 elongate body
14 first strut
15 first fastening
16 second strut
17 third strut
18 fourth strut
19 third fastening
20 third fixture
21 first fixture
22 movable connection
23 outer member
24 inner member
25 spring
30 jig
31 support structure
32 height adjustment device
33 first part
34 inclined inner surface
35 second part
36 inclined inner surface
37 wedge
38 inclined outer surface
39 inclined outer surface
41 frame
42 supporting member
43 opening
44 vertical member
45 longitudinal beam
46 transverse section
47 component fixture
48 second fastening
49 second fixture

The invention claimed is:

1. A method for installing a fastening structure for at least one component on an attachment structure of a vehicle interior, the method comprising:
providing the fastening structure comprising at least one unit, the unit comprising:
an elongate body,
a first strut detachably coupled between the elongate body and a first fastening for fastening the unit to the attachment structure,
a second strut detachably coupled between the elongate body and the first fastening and extending at an inclined angle to the elongate body,
wherein at least one of the first strut or second strut are variably positionable with respect to the elongate body to provide tolerance compensation and are lockable in an end position;
providing a jig comprising:
a support structure that is detachably couplable to the elongate body of the fastening structure, and
one or more height adjustment devices on which the support structure is mounted, the height adjustment device being continuously adjustable and lockable in a desired position,
adjusting the height adjustment device of the jig such that the first elongate body is arranged at a pre-determined height;
moving the jig with respect to the attachment structure such that the first fastening engages with a first fixture of the attachment structure;
fastening the first fastening to the first fixture to install the fastening structure on the attachment structure, whereby the variably positionable nature of the at least one of the first strut or the second strut provides tolerance compensation between the elongate body and the first fixture,
wherein the height adjustment device comprises:
a first part having an inclined inner surface, and
a second part having an inclined inner surface, the inclined inner surfaces cooperating to form a wedge-shaped gap,
a wedge that is slidably arranged between the inclined inner surfaces of the first and second part,
wherein moving the height adjustment devices comprises moving the wedge in a substantially horizontal direction and causing the first and second parts to move apart in a substantially vertical direction, thus adjusting a height of the support structure such that the elongate body is arranged at the pre-determined height.

2. The method according to claim 1, further comprising moving the jig with respect to the attachment structure in a longitudinal direction of the vehicle such that the first fastening engages with the first fixture.

3. The method according to claim 1, further comprising installing at least one further unit on the attachment structure adjacent the unit in a longitudinal direction of the vehicle, wherein a position of the elongate body of the further unit is positioned at the pre-determined height by means of the height adjustment device.

4. The method according to claim 1, wherein the elongate body is detachably coupled to the first strut by a connector and one height adjustment device is arranged underneath the connector.

5. The method according to claim 1, wherein at least one of the first strut or second strut are variably positionable with respect to the elongate body to provide tolerance compensation in a longitudinal and vertical direction.

6. The method according to claim 1, wherein at least one of the first strut or the second strut has at least one of an adjustable length or an adjustable angular orientation with respect to at least one of the elongate body or the first fastening comprises a spring to provide tolerance compensation.

7. The method according to claim 1, wherein the second strut is slidably coupled to the elongate body to provide at least one of tolerance compensation or the first strut is coupled to the first elongate body by an articulated joint to provide tolerance compensation.

8. The method according to claim 1, wherein at least one of the first strut or second strut comprises an inner member slidably engaged with an outer member to provide an adjustable length.

9. The method according to claim 1, wherein after fastening the first fastening to the first fixture, locking a position of at least one of the first or second strut with respect to the elongate body and removing the jig.

10. The method according to claim 1, wherein the elongate body comprises a component fixture for fastening the component to the elongate body.

11. The method according to claim 1,
wherein the vehicle is an aircraft and the attachment structure is provided by a fuselage structure comprising a plurality of fuselage frames spaced apart in a longitudinal direction of the fuselage,
wherein the fastening structure is fastened to one of the fuselage frames and the elongate body is spaced apart from the fuselage.

12. The method according to claim 1, wherein the fastening structure comprises at least one module, wherein the module comprises:
the unit comprising a first unit,
an upper, second unit comprising an elongate body, a first strut detachably coupled between the elongate body and a second fastening for fastening the upper unit to the attachment structure, a second strut detachably coupled between the elongate body and the second fastening and extending at an inclined angle to the elongate body, wherein at least one of the first strut or second strut are variably positionable with respect to the elongate body to provide tolerance compensation and are lockable in an end position;
a connection unit comprising a third strut and a fourth strut movably coupled with a third fastening, wherein the third strut is coupled to the elongate body of the first unit and the fourth strut is coupled to the elongate body of the second unit,
the method further comprising
fastening the second fastening to a second fixture of the attachment structure, and
fastening the third fastening to a third fixture of the attachment structure to install the module on the attachment structure.

13. The method according to claim 12, wherein the elongate body of the upper unit is detachably coupled to the first strut of the upper unit by a connector and one height adjustment device is arranged underneath the connector and adjusted such that the elongate body of the upper unit is positioned at a predetermined height.

14. A jig for installing a fastening structure for at least one cabin interior component on a fuselage structure of an interior of an aircraft fuselage, wherein the fuselage structure comprises a plurality of fuselage frames spaced apart in a longitudinal direction of the fuselage, wherein the fastening structure comprises a unit comprising:
an elongate body,
a first strut detachably coupled between the elongate body and a first fastening for fastening the unit to the fuselage structure,
a second strut detachably coupled between the elongate body and the first fastening and extending at an inclined angle to the elongate body,
wherein at least one of the first strut or second strut are variably positionable with respect to the elongate body to provide tolerance compensation and are lockable in an end position,
wherein the jig comprises:
a support structure that is detachably couplable to the elongate body, and
one or more height adjustment devices on which the support structure is mounted, the height adjustment device being continuously adjustable and lockable in a desired position,
wherein the height adjustment device comprises a first part having an inclined inner surface and a second part having an inclined inner surface, the inclined inner surfaces cooperating to form a wedge-shaped gap, a wedge that is slidably arranged between the inclined inner surfaces of the first and second part,
wherein moving the height adjustment device comprises moving the wedge in a substantially horizontal direction and causing the first and second parts to move apart in a substantially vertical direction, thus adjusting a height of the support structure such that the elongate body can be arranged at a pre-determined height.

* * * * *